United States Patent Office 2,998,403
Patented Aug. 29, 1961

2,998,403
REACTION PRODUCT OF A DIISOCYANATE, A POLYESTER AND A POLYALKYLENE ETHER GLYCOL, AND PROCESS OF MAKING SAME
Erwin Müller, Otto Bayer, and Heinrich Morschel, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Apr. 25, 1956, Ser. No. 580,437
Claims priority, application Germany Apr. 28, 1955
8 Claims. (Cl. 260—45.4)

This invention relates to rubber-like polyurethane plastics and a process for producing the same.

In U.S. Patent 2,729,618, there is described a process for the production of cross-linked plastics which comprises reacting an isocyanate-modified polyester containing free isocyanate groups with a glycol, such as butylene glycol, diethylene glycol and quinitol. The reaction of the glycol with the isocyanate groups of the isocyanate-modified polyester results in chain-lengthening through urethane groups, said chain-lengthening being followed by cross-linking and formation of a rubber-like material when the initial reaction product is subjected to a heat treatment.

It is an object of the present invention to provide rubber-like polyurethane plastics which in some respects are superior to the known rubber-like polyurethane plastics. Another object is to provide rubber-like polyurethane plastics exhibiting improved resistance to saponifying agents. A further object is to provide rubber-like polyurethane plastics, the properties of which are not adversely affected by low temperatures. Still further objects will appear hereinafter.

In accordance with the present invention, it has been found that very valuable polyurethane plastics can be obtained if a diisocyanate is reacted with a linear or predominantly linear hydroxyl polyester and an hydroxyl polyether in which the ether oxygen atoms are separated by carbon chains of at least three carbon atoms.

It is known to produce rubber-like polyurethane plastics from diisocyanates, linear hydroxyl polyesters and certain ethylene glycols. For example, di- and triethylene glycol and also certain higher ethylene glycols have already been used along with hydroxyl polyesters in the reaction with diisocyanates. The plastics produced in this manner, however, showed a pronounced hydrophilic character as well as undesirable mechanical properties, said hydrophilic character making them susceptible to degradation by water and saponifying agents.

The present invention is based on the surprising observation that the above disadvantages, which considerably restrict the scope of application of polyurethanes derived from hydroxyl polyethers, can be avoided if as hydroxyl polyethers, there are employed compounds in which the ether oxygen atoms are separated by carbon chains of at least three carbon atoms.

Hydroxyl polyethers in which the ether oxygen atoms are separated by carbon chains of at least three carbon atoms include dipropylene glycol and dibutylene glycol. Hydroxyl polyethers of higher molecular weight may also be used in the practice of the invention if the ether oxygen atoms are separated by carbon chains of at least three carbon atoms, representative examples being compounds obtained by polymerization of the above oxides in the presence of polymerization accelerators and chain-breaking substances, such as acetyl chloride, and subsequent saponification by methods which are known per se. Another group of suitable hydroxyl polyethers may be obtained by polymerizing tetrahydrofurane in the presence of thionyl chloride and ferric chloride and reacting the chlorine-containing polymerization products thus formed with glycols, such as 1,4-butylene glycol, about one mol of glycol being used per chlorine atom contained in said polymerization products.

The present invention contemplates using either individual hydroxyl polyethers of the above-identified type or mixtures thereof. It is, of course, also possible to employ the above-defined polyethers together with other hydroxyl compounds, such as hydroxyl compounds containing two aliphatically bonded hydroxyl groups and at least two aromatic ring systems. The last-mentioned hydroxyl compounds may also contain ester groups or functional groups, such as urea, urethane, carbon amide and sulphamide groups, capable of reacting with isocyanates as described in our copending application Serial No. 434,062, filed June 2, 1954, now Patent No. 2,861,972.

The polyester and the polyether which are to be reacted with an diisocyanate are used in a proportion within the range of about 10%–90% and about 90%–10% by weight, preferably the polyether being employed within the range of about 10%–30% by weight. The diisocyanate is employed in a slight excess of about 0.1%–5% of NCO groups calculated on the sum of hydroxyl groups contained in the polyester and polyether.

In carrying out the process of the invention, the hydroxyl polyester, which has preferably been freed from the last traces of water by heating in vacuo, may be reacted at a temperature of about 100–150° C. with a diisocyanate in an amount in excess, preferably 2–5%, calculated on NCO groups, over that required for reacting with the hydroxyl groups, and the isocyanate-modified polyester thus produced may then be reacted at 100–150° C. with a hydroxyl polyether of the above-defined type. The ratio of polyester:polyether should be within the range of about 10–90% and 90–10% by weight, preferably the polyether being employed within the range of about 10–30% by weight.

Without changing reaction temperature and proportions of the components it is also possible to follow the converse procedure as outlined above, i.e., to react the hydroxyl polyether with excess diisocyanate and to subsequently add the hydroxyl polyester.

Furthermore, the process of the invention can be performed by adding the hydroxyl polyether to the hydroxyl polyester prior to or after dehydrating the latter and then reacting the diisocyanate with the mixture. In this case the reaction conditions will remain unchanged.

Another embodiment of the invention, which proves particularly satisfactory when the reaction is to be carried out in two stages separated by a certain period of time, involves reacting one mole of the hydroxyl polyester at a temperature of 70–120° C. with the diisocyanate in an amount smaller than that calculated for the hydroxyl groups of the polyester, preferably with 0.7–0.99 mole of diisocyanate. After the reaction has been completed the hydroxyl polyether in an amount of 0.1–1 mole is to be admixed and reaction completed at a later time by adding a further amount of diisocyanate in the cold. The product is then after-heated for some hours at a temperature of 120–160° C. The diisocyanate is used in the second stage in an amount in excess of 0.5–5% calculated on the sum of hydroxyl groups contained in the isocyanate-modified polyester/polyether mixture.

It is also possible to react the hydroxyl polyester at a temperature of 100–150° C. with the diisocyanate in an amount in excess of that required for the reaction with the hydroxyl groups of the hydroxyl polyester, preferably with 1.1–2 moles of diisocyanate, and to add the hydroxyl polyether in such an amount as to provide an excess of hydroxyl groups, preferably 0.1–5%, over the isocyanate groups still present. The reaction is then completed at a later time and in the cold by adding an additional amount of diisocyanate. The diisocyanate is used in a slight excess of 0.5–5% calculated on the isocyanate groups required for the reaction with the hydroxyl groups still present. The reaction product is finally after-heated for some hours at a temperature of 120–160° C.

The diisocyanate component may be either a monomeric or a dimeric diisocyanate which on heating yields additional free isocyanate groups (see our copending application Serial No. 518,942, filed June 29, 1955 now Patent No. 2,916,472.

The hydroxyl polyesters used in the practice of the invention are the hydroxyl polyesters commonly used in the production of rubber-like polyurethanes. They may be obtained by known methods, such as by thermal esterification of dibasic acids with dihydric alcohols at a temperature of about 160°–220° C., the alcohol being used in excess in order to obtain a product with terminal hydroxyl groups. Dibasic acids suitable for preparing these hydroxyl polyesters include adipic acid, succinic acid and sebacic acid while ethylene glycol, propylene glycol-1,3, the butylene glycols-1,3 and -1,4 and diethylene glycol are among the dihydric alcohols commonly used in the esterification.

Representative examples of diisocyanates which are used in the practice of the invention include 1,5-naphthylene diisocyanate, p,p'-diphenylmethane diisocyanate, p-phenylene diisocyanate, toluylene diisocyanate-2,4 and -2,6 and dimeric diisocyanates containing two free and two hidden isocyanate groups, such as dimeric toluylene diisocyanate.

The rubber-like polyurethane plastics of the invention exhibit a good resistance to saponifying agents, such as steam and alkali. Another attractive feature of the new rubber-like polyurethane plastics is that the mechanical properties of the same are not adversely affected by low temperatures. Moreover, the rubber-like polyurethane plastics of the invention have a low hardness factor and a good structure despite the low modulus. In view of these desirable properties, the new rubber-like polyurethane plastics can find applications in fields closed to the conventional rubber-like polyurethane plastics.

The details of the present invention will be apparent to those skilled in the art from a consideration of the following specific examples which are illustrative only and are in no way to be construed as limiting.

*Example 1*

200 g. of a glycol-adipic acid polyester with the OH number 54 and acid number 1 are dehydrated at 130° C. at a pressure of 12 mm. and 34 g. of 1,5-naphthylene diisocyanate are introduced at the same temperature while stirring. The temperature rises to 138° C. After about 15 minutes, 24.4 g. of a bifunctional tetrahydrofurane polymer with a content of 6.2% of hydroxyl groups are stirred into the melt. The melt, which is initially somewhat cloudy, is poured into moulds and heated for 24 hours at 100° C. A transparent material having rubber-like elasticity is formed and this material has the following mechanical properties:

| | |
|---|---|
| Strength _____kg./cm.$^2$__ | 264 |
| Elongation _____percent__ | 810 |
| Permanent elongation_____percent__ | 20 |
| Structure _____ | 36 |
| Loading at 300% elongation_____ | 31 |
| Hardness _____ | 62 |
| Elasticity _____ | 60 |

By using 43 g. of 1,5-naphthylene diisocyanate instead of 34 g. and 48.8 g. of tetrahydrofurane polymer instead of 24.4 g., while maintaining the other conditions and proportions, a material is obtained having the following properties:

| | |
|---|---|
| Strength _____kg./cm.$^2$__ | 244 |
| Elongation _____percent__ | 817 |
| Permanent elongation_____percent__ | 21 |
| Structure _____ | 31 |
| Loading at 300% elongation_____ | 19 |
| Elasticity _____ | 53 |
| Hardness _____ | 56 |

If the tetrahydrofurane polymer is added to the polyester while maintaining the proportions indicated for the first reaction and if the reaction with the 1,5-naphthylene diisocyanate then takes place, a material is obtained having the following properties:

| | |
|---|---|
| Strength _____kg./cm.$^2$__ | 221 |
| Elongation _____percent__ | 720 |
| Permanent elongation_____percent__ | 14 |
| Structure _____ | 28 |
| Loading at 300% elongation_____ | 26 |
| Elasticity _____ | 56 |
| Hardness _____ | 56 |

*Example 2*

200 g. of a glycol-adipic acid polyester with the OH number 53 and the acid number 1 were mixed with 48.8 of a tetrahydrofurane polymer with a content of 6.2% of hydroxyl groups and dehydrated at 130° C. After dehydration, 39 g. of 1,5-naphthylene diisocyanate were added slowly at 130° C. and the viscous melt heated overnight at 100° C. in a drying chamber. The material thus obtained can be rolled out to a smooth sheet and after mixing in 5% of diphenyl-methane diisocyanate and finally pressing the material, the latter has properties similar to those indicated in Example 1.

*Example 3*

200 g. of a glycol-adipic acid polyester with the OH number 53 and the acid number 1 are mixed, after being carefully dehydrated at 130° C., with 34 g. of 1,5-naphthylene diisocyanate. 13.6 g. of tetrabutylene glycol with a hydroxyl content of 11.2% are then mixed therewith by stirring, the melt is cast into moulds and further heated for 24 hours at 100° C. The material shows the following mechanical properties:

| | |
|---|---|
| Strength _____kg./cm.$^2$__ | 286 |
| Elongation _____percent__ | 765 |
| Permanent elongation_____percent__ | 18 |
| Structure _____ | 38 |
| Loading at 300% elongation_____ | 41 |
| Elasticity _____ | 59 |
| Hardness _____ | 64 |

While certain representative embodiments and details have been shown for the purpose of illustrating this invention, it will be apparent to those skilled in the art that various changes and modifications may be made therein without departing from the spirit and scope of the invention.

What is claimed is:

1. In the preparation of a rubber-like polyurethane by a process which comprises reacting an organic diisocyanate with an organic compound having hydrogen atoms reactive with an —NCO group, the improvement which comprises reacting an organic diisocyanate with both a predominately hydroxyl terminated polyester prepared by esterification of a dicarboxylic acid and dihydric alcohol and a polyalkylene ether glycol having ether oxygen atoms which are separated only by aliphatic carbon to carbon chains of four carbon atoms, the amount of polyalkylene ether glycol being from about 10 percent to about 90 percent of the total amount of polyalkylene ether glycol and polyester and the total amount of organic diisocyanate being sufficient to supply an excess of from about 0.1 percent to about 5 percent —NCO groups over that required to react with all of the hydroxyl groups of the polyester and polyalkylene ether glycol.

2. The process of claim 1 wherein the polyalkylene ether glycol and polyester are mixed together before they are reacted with the organic polyisocyanate.

3. A rubber-like polyurethane prepared by a process which comprises reacting an organic diisocyanate with both a predominately hydroxyl terminated polyester prepared by esterification of a dicarboxylic acid and a dihydric alcohol and a polyalkylene ether glycol having ether oxygen atoms separated only by aliphatic carbon to carbon chains of four carbon atoms, the amount of polyalkylene ether glycol being from about 10 percent to about 90 percent of the total amount of polyalkylene ether glycol and polyester, the amount of organic diisocyanate being sufficient to supply an excess of from about 0.5 percent to about 5 percent —NCO groups over that required to react with all of the hydroxyl groups of the polyester and polyalkylene ether glycol.

4. In the preparation of a rubber-like polyurethane by a process which comprises reacting an organic diisocyanate with an organic compound having hydrogen atoms reactive with an —NCO group, the improvement which comprises reacting an organic diisocyanate with a predominately hydroxyl terminated polyester prepared by esterification of a dibasic acid and a hihydric alcohol, the ratio of diisocyanate to polyester being from about 0.7 mol to about 0.99 mol diisocyanate per mol of polyester, reacting the resulting product and an hydroxyl terminated polyalkylene ether glycol having ether oxygen atoms separated only by aliphatic carbon to carbon chains of four carbon atoms with an organic diisocyanate, the ratio of reactants in the last said reaction being from about 0.3 mol to 1 mol hydroxyl polyalkylene ether glycol per mol polyester from about 0.5 percent to about 5 percent by weight excess diisocyanate over that required to react with all of the hydroxyl groups of the isocyanate-modified polyester and polyalkylene ether glycol in the mixture.

5. A rubber-like polyurethane obtained by a process which comprises reacting an organic diisocyanate with an organic compound having hydrogen atoms reactive with an —NCO group, the improvement which comprises reacting an organic diisocyanate with a predomonately hydroxyl terminated polyester prepared by esterification of a dibasic acid and a dihydric alcohol, the ratio of diisocyanate to polyester being from about 0.7 mol to about 0.99 mol diisocyanate per mol of polyester, reacting the resulting product and an hydroxyl terminated polyalkylene ether glycol having ether oxygen atoms separated only by aliphatic carbon to carbon chains of four carbon atoms with an organic diisocyanate, the ratio of reactants in the last said reaction being from about 0.3 mol to about 1 mol hydroxyl polyalkylene ether glycol per mol polyester from about 0.5 percent to about 5 percent by weight excess diisocyanate over that required to react with all of the hydroxyl groups of the isocyanate-modified polyester and polyalkylene ether glycol in the mixture.

6. In a preparation of a polyurethane by a process which comprises reacting an organic diisocyanate with an organic compound having hydrogen atoms reactive with an —NCO group, the improvement which comprises reacting a predominately hydroxyl terminated polyester prepared by esterification of a dicarboxylic acid and a dihydric alcohol with an organic diisocyanate present in an excess of from about 0.1 percent to about 5 percent —NCO groups over that required to react with all of the hydroxyl groups of the polyester and thereafter reacting the resulting product with a polyalkylene ether glycol having ether oxygen atoms which are separated only by aliphatic carbon to carbon chains of four carbon atoms, the ratio of polyalkylene ether glycol in the reaction mixture being from about 10 percent to about 90 percent of the total amount of polyalkylene ether glycol and isocyanate-modified polyester.

7. A rubber-like polyurethane prepared by a process which comprises reacting a predominately hydroxyl terminated polyester prepared by esterification of a dicarboxylic acid and a dihydric alcohol with an organic diisocyanate present in an excess of from about 0.1 percent to about 5 percent —NCO groups over that required to react with all of the hydroxyl groups of the polyester and thereafter mixing the resulting mixture with a polyalkylene ether glycol having ether oxygen atoms which are separated only by aliphatic carbon to carbon chains of four carbon atoms, the ratio of polyalkylene ether glycol in the reaction mixture being from about 10 percent to about 90 percent of the total amount of polyalkylene ether glycol and isocyanate-modified polyester.

8. In the preparation of a polyurethane by a process which comprises reacting an organic diisocyanate with an organic compound having hydrogen atoms reactive with an —NCO group, the improvement which comprises reacting a polyalkylene ether glycol having ether oxygen atoms which are separated only by aliphatic carbon to carbon chains of four carbon atoms with an organic diisocyanate present in an excess of from about 0.1 percent to about 5 percent —NCO groups over that required to react with all of the hydroxyl groups of the polyalkylene ether glycol, and thereafter reacting the resulting product with a predominately hydroxyl terminated polyester prepared by esterification of a dibasic acid and a dihydric alcohol, the amount of polyalkylene ether glycol being from about 10 percent to about 90 percent by weight of the total amount of organic compound having reactive hydrogen atoms reacted with the organic diisocyanate.

References Cited in the file of this patent

UNITED STATES PATENTS

| 2,432,148 | Furness | Dec. 9, 1947 |
| 2,621,166 | Schmidt et al. | Dec. 9, 1952 |
| 2,729,618 | Muller et al. | Jan. 3, 1956 |
| 2,780,350 | Simon et al. | Feb. 5, 1957 |
| 2,799,663 | Hampton et al. | July 16, 1957 |
| 2,814,606 | Stilman | Nov. 26, 1957 |
| 2,852,483 | Mason | Sept. 16, 1958 |

OTHER REFERENCES

Martin: "The Chemistry of Phenolic Resins," 1956, page 130, published by Wiley & Sons, New York.